US012609032B2

(12) United States Patent
Elimaleh

(10) Patent No.: US 12,609,032 B2
(45) Date of Patent: Apr. 21, 2026

(54) VULNERABLE ROAD USER (VRU) COLLISION AVOIDANCE SYSTEM

(71) Applicant: Mobileye Vision Technologies Ltd., Jerusalem (IL)

(72) Inventor: Yaniv Elimaleh, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 178 days.

(21) Appl. No.: 18/293,478

(22) PCT Filed: Aug. 2, 2022

(86) PCT No.: PCT/IB2022/057175
§ 371 (c)(1),
(2) Date: Jan. 30, 2024

(87) PCT Pub. No.: WO2023/012671
PCT Pub. Date: Feb. 9, 2023

(65) Prior Publication Data
US 2025/0118205 A1 Apr. 10, 2025

Related U.S. Application Data

(60) Provisional application No. 63/228,250, filed on Aug. 2, 2021.

(51) Int. Cl.
*G08G 1/16* (2006.01)
*B60W 30/09* (2012.01)
(Continued)

(52) U.S. Cl.
CPC ............. *G08G 1/166* (2013.01); *B60W 30/09* (2013.01); *B60W 30/0953* (2013.01);
(Continued)

(58) Field of Classification Search
None
See application file for complete search history.

(56) References Cited

U.S. PATENT DOCUMENTS 9,233,659 B2 * 1/2016 Rosenbaum ........... G06V 20/58
11,230,297 B2 * 1/2022 Zhu ......................... G06V 20/58
(Continued)

FOREIGN PATENT DOCUMENTS

EP 3342664 A1 7/2018
WO 2016209423 A1 12/2016
(Continued)

OTHER PUBLICATIONS

Nov. 8, 2022 (PCT) International Search Report and Written Opinion—App. PCT/IB2022/057175.

*Primary Examiner* — Todd Melton
(74) *Attorney, Agent, or Firm* — Banner & Witcoff, Ltd.

(57) ABSTRACT

Techniques are disclosed for reducing false positives for generating warnings to avoid potential collisions between a vehicle and vulnerable road users (VRUs). This is accomplished via an onboard vehicle safety system that uses crowdsourced map data to determine whether a vehicle is capable of performing a maneuver that results in a lateral shift of the vehicle (which may include a lane-shifting or turning maneuver) within a predetermined threshold time period. The ability for the vehicle to make the turning maneuver, among other driving scenarios, may be used to by the safety system to intelligently determine whether a warning or other action is needed to avoid a potential collision with a VRU. In this way, the occurrence and number of false warnings/interventions are minimized or at least reduced, leading to more attentive drivers and thereby improving VRU safety.

18 Claims, 7 Drawing Sheets

(51) Int. Cl.

| | |
|---|---|
| *B60W 30/095* | (2012.01) |
| *G06T 7/20* | (2017.01) |
| *G06T 7/70* | (2017.01) |
| *G06V 10/25* | (2022.01) |
| *G06V 20/56* | (2022.01) |
| *G06V 20/58* | (2022.01) |
| *G08G 1/052* | (2006.01) |

(52) U.S. Cl.
CPC ........... *B60W 30/0956* (2013.01); *G06T 7/20* (2013.01); *G06T 7/70* (2017.01); *G06V 10/25* (2022.01); *G06V 20/58* (2022.01); *G06V 20/588* (2022.01); *G08G 1/052* (2013.01); *B60W 2556/45* (2020.02); *B60W 2756/10* (2020.02); *G06T 2207/30256* (2013.01); *G06T 2207/30261* (2013.01)

(56) References Cited

U.S. PATENT DOCUMENTS

| | | | | |
|---|---|---|---|---|
| 12,049,211 B2 * | 7/2024 | Brickwedde | ...... | B60W 30/0956 |
| 2019/0329768 A1 | 10/2019 | Shalev-Shwartz et al. | | |

FOREIGN PATENT DOCUMENTS

| | | | | |
|---|---|---|---|---|
| WO | WO-2017030494 A1 * | 2/2017 | ........... | G01S 15/931 |
| WO | 2020245654 A1 | 12/2020 | | |

* cited by examiner

500

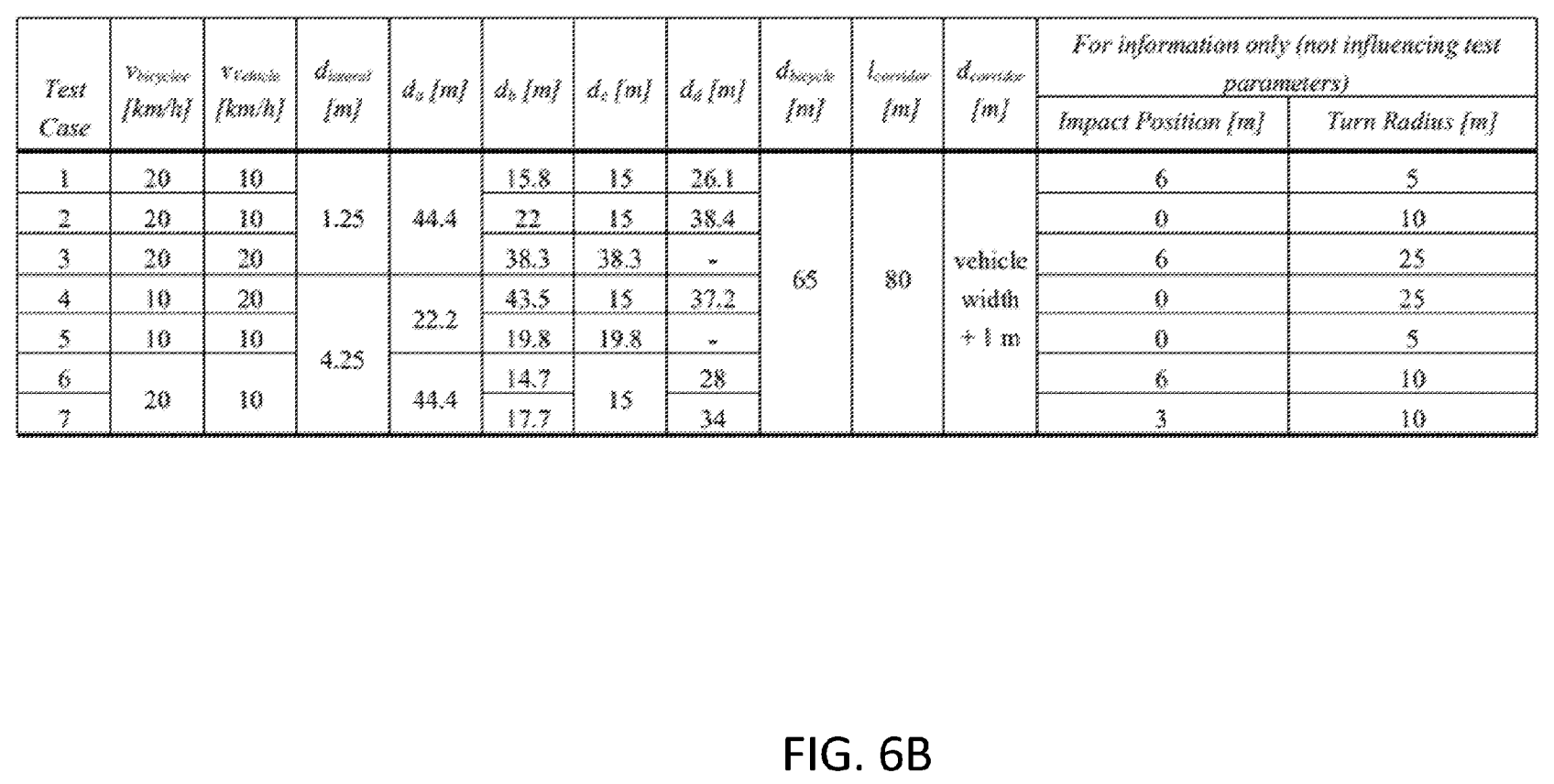

| Test Case | $V_{target}$ [km/h] | $V_{vehicle}$ [km/h] | $d_{lateral}$ [m] | $d_0$ [m] | $d_b$ [m] | $d_c$ [m] | $d_d$ [m] | $d_{height}$ [m] | $l_{corridor}$ [m] | $d_{corridor}$ [m] | For information only (not influencing test parameters) | |
|---|---|---|---|---|---|---|---|---|---|---|---|---|
| | | | | | | | | | | | Impact Position [m] | Turn Radius [m] |
| 1 | 20 | 10 | 1.25 | 44.4 | 15.8 | 15 | 26.1 | 65 | 80 | vehicle width + 1 m | 6 | 5 |
| 2 | 20 | 10 | | | 22 | 15 | 38.4 | | | | 0 | 10 |
| 3 | 20 | 20 | | | 38.3 | 38.3 | - | | | | 6 | 25 |
| 4 | 10 | 20 | 4.25 | 22.2 | 43.5 | 15 | 37.2 | | | | 0 | 25 |
| 5 | 10 | 10 | | | 19.8 | 19.8 | - | | | | 0 | 5 |
| 6 | 20 | 10 | | 44.4 | 14.7 | 15 | 28 | | | | 6 | 10 |
| 7 | | | | | 17.7 | | 34 | | | | 3 | 10 |

FIG. 6B

VULNERABLE ROAD USER (VRU) COLLISION AVOIDANCE SYSTEM

CROSS-REFERENCE TO RELATED APPLICATIONS

This application claims the benefit of and priority to U.S. provisional application No. 63/228,250, filed Aug. 2, 2021, the contents of which are incorporated herein by reference in their entirety.

TECHNICAL FIELD

Aspects described herein generally relate to techniques for generating warnings to avoid potential collisions between a vehicle and vulnerable road users (VRUs).

BACKGROUND

Many vehicles have blind spots, which blocks the ability of the operator of the vehicle to notice hazards at certain areas around the vehicle. In dense urban environments, where for example pedestrians and cyclists often share the road with vehicles, such blind spots represent a serious problem and can lead to grave results. Blind spots may be a particularly severe problem for operators of large vehicles (sometimes referred to as "long haul vehicles"), such as trucks (or Lorries) and public transport vehicles, especially in urban environments.

The term vulnerable road user (VRU) is used mainly to describe those unprotected by an outside shield, as they sustain a greater risk of injury in any collision with a vehicle and are therefore highly in need of protection against collisions with other vehicles on the road. This broad definition can include (but is not limited to) the aforementioned pedestrians as cyclists, as well as roadway workers, a person operating a wheelchair or other personal mobility device, whether motorized or not, a person operating an electric scooter or similar, and a person operating a bicycle or other nonmotorized means of transportation. Motorcycle operators can also be considered VRUs due to their lack of vehicle enclosure and higher risk of injury in a collision.

Due to the high number of injuries experienced by VRUs, there has been interest in increasing safety and introducing regulations aimed to protect them. This includes the recently proposed United Nations Economic Commission for Europe (UNECE) regulation ECE151, the most recent publication at the time of this writing being found at https://unece.org/sites/default/files/2021-08/R151am2e.pdf, and which requires a blind spot information system (BSIS) to inform a driver of a possible collision with a VRU. Such new regulations are typically directed at so-called "long" vehicles, which may include a category of large vehicles such as lorries, trucks, tractor-trailers, etc., and which frequently have dimensions defined by statute or regulation. For purposes of this description, a long vehicle is a vehicle that given standard side mirrors (or even special mirrors in particular cases), exhibits a dead spot in at least one area around the vehicle, which blind spot possesses a risk for an object the size of a pedestrian or any other VRU, say a blind spot in the order of 1.5 times (or 2 times or 1.25 times, etc.) the size of an adult man. The risk can be especially severe in turns, where due to their length, long vehicles tend to make wide arcs, and if a VRU is in the blind spot of the long vehicle during the turn, the long vehicle operator may not be able to notice the VRU at the critical moment and run over the VRU.

Current systems to warn drivers of potential VRU collisions, such as those required by such new proposed regulations, are inadequate. For instance, to pass the ECE151 regulation requirements in particular requires that a system know a theoretical future collision point, which requires knowing a turning point in advance. But because such information is not typically readily available for conventional vehicular systems, conventional blind-spot monitoring systems provide a warning at all times a few seconds before every theoretical collision point, which also includes when driving in a straight line and when a theoretical collision is not possible, e.g. when the layout of the road and/or current lane occupied by the vehicle prevents a turning maneuver. This results in the generation of many false positive warnings, which risks desensitizing drivers.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 6B illustrates a table with data corresponding to different test cases as provided by the UNECE regulation ECE151.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Vehicle Component Architecture and Operation

Figure 1:
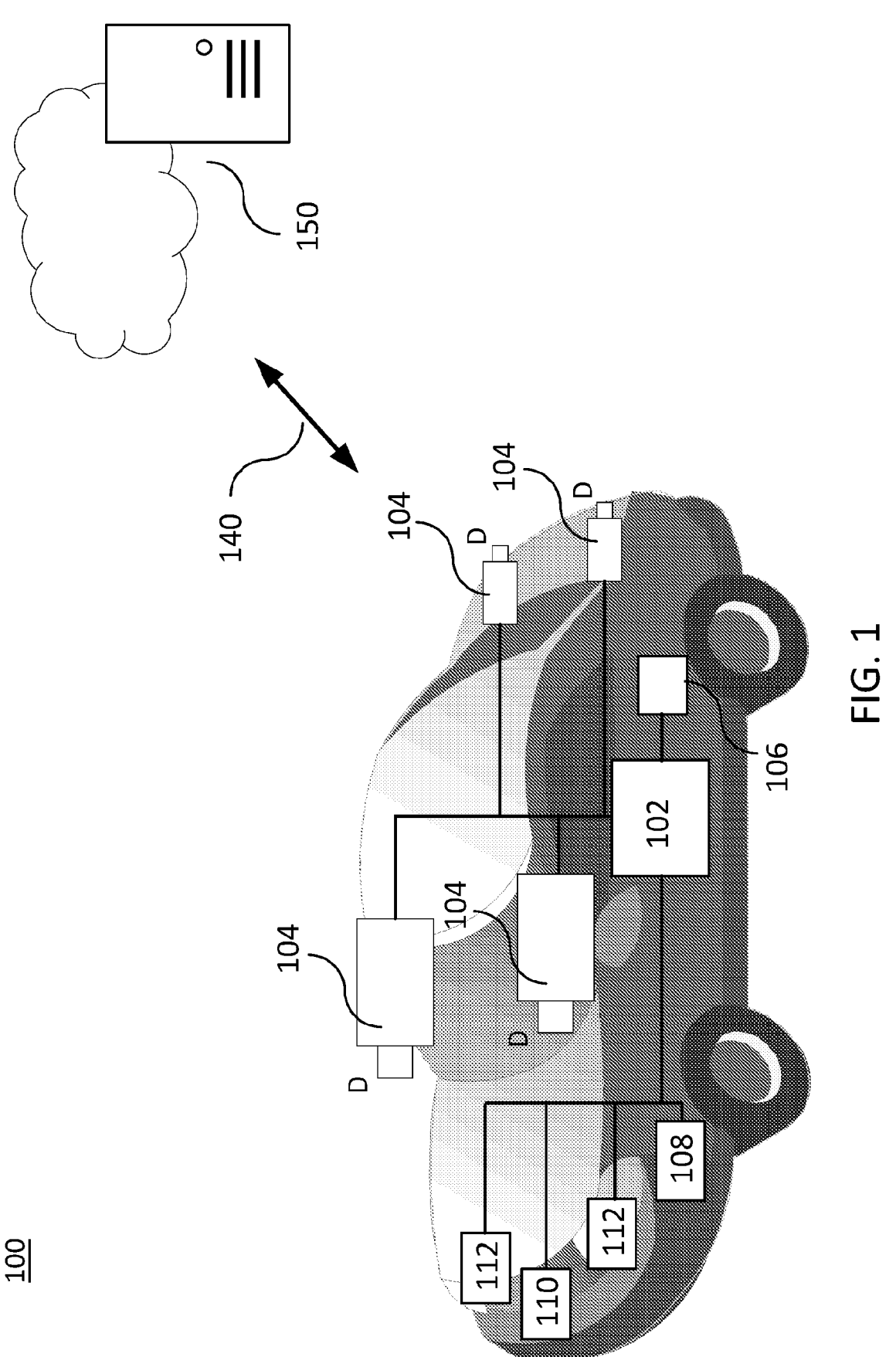
FIG. 1 illustrates an exemplary vehicle in accordance with one or more aspects of the present disclosure.

FIG. 1 illustrates a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or an advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle 100's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementations within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
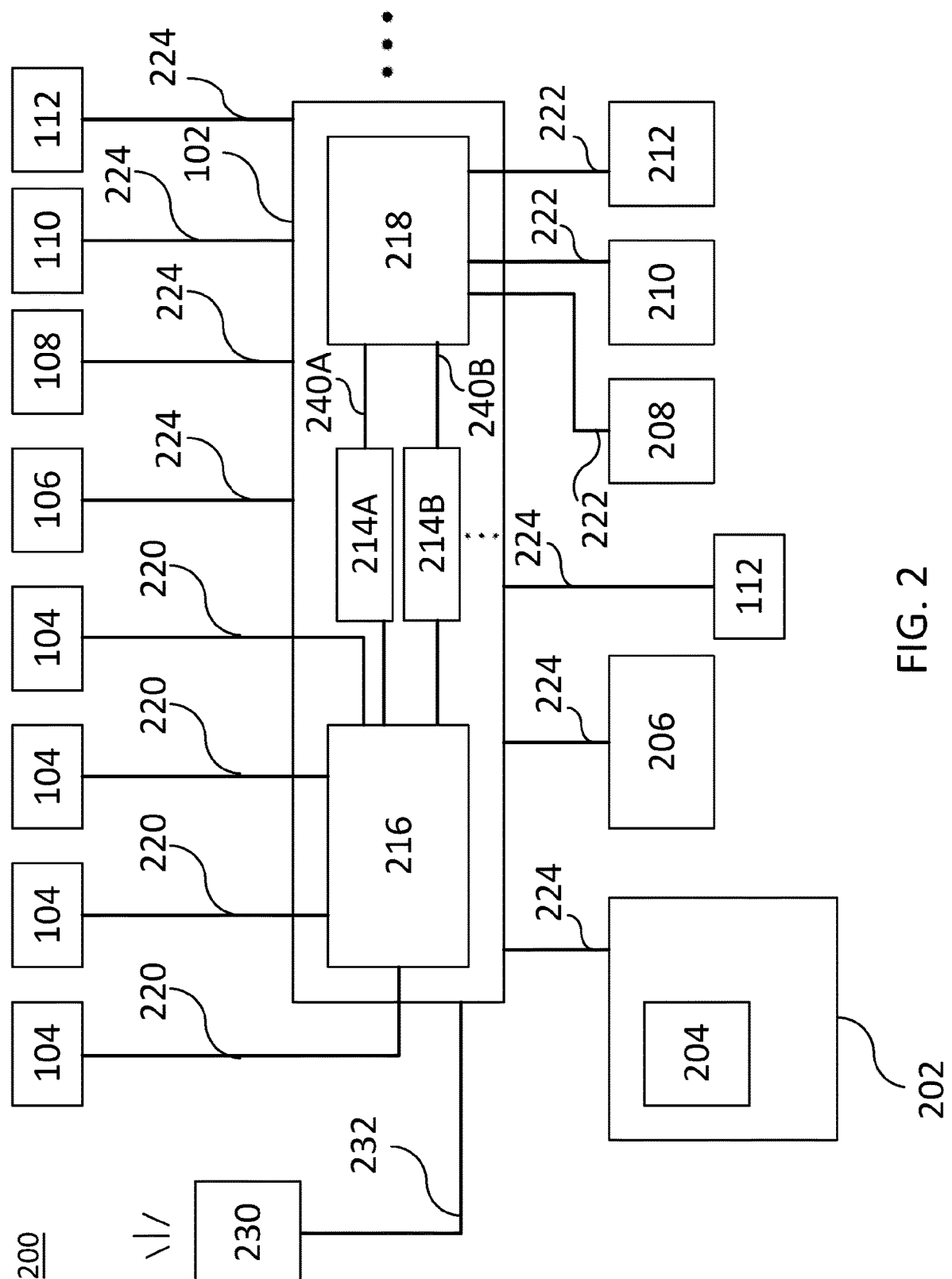
FIG. 2 illustrates various exemplary electronic components of a safety system of a vehicle in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices 150 via one or more wireless links 140. This may include, for instance, communications with a remote server or other suitable computing system as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or portion of an advanced driver-assistance system (ADAS).

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors may thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any suitable wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example. Of course, the application processors 214A, 214B may perform other functions in addition to or as an alternative to control-based functions, such as the image processing functions discussed herein to detect VRUs and to detect possible collisions with detected VRUs, as well as provide warnings regarding such possible VRU collisions.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.). Any of these various metrics may be used in addition to or instead of the other techniques as discussed herein to ensure that the generated warnings with respect to potential collisions with a VRU are more relevant. For instance, warnings may be suppressed if the vehicle 100 is currently reversing or if the steering angle does not result in the vehicle 100 crossing into a bike lane within a threshold period of time or distance. Moreover, the vehicle components 230 may include any suitable number and/or type of components that may issue a warning to warn the driver of the vehicle 100 of an imminent collision with a VRU to avoid the collision, as further disused herein. This may include any audio components, visual components, or combinations of both such as an in-vehicle infotainment (IVI) system that issues such a warning.

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with any of the aspects described in further detail below. This may include, for example, controlling the operation of the safety system 200 and/or performing VRU detection, collision detection, warning generation, etc., in accordance with any of the aspects as discussed herein.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions. Again, such a controller or system may be configured to execute the various to perform functions related to VRU detection, collision detection, warning generation, etc. as discussed in further detail herein, to the control of the state of the vehicle in which the safety system 200 is implemented, etc.

In some aspects, the safety system 200 may further include components such as a speed sensor 108 (e.g. a speedometer) for measuring a speed of the vehicle 100. The safety system 200 may also include one or more accelerometers (either single axis or multiaxis) (not shown) for measuring accelerations of the vehicle 100 along one or more axes, and additionally or alternatively one or more gyro sensors, which may be implemented for instance to detect if the vehicle 100 makes a turn or change lane, which may be used to generate the warning in various driving scenarios as discussed further herein. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

Data referred to as REM map data (or alternatively as roadbook map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. Regardless of where the REM map data is stored and/or accessed, the REM map data may include a geographic location of known and non-transient landmarks that are readily identifiable (e.g., by the safety system 200 or similar ADAS systems) in the navigated environment in which the vehicle 100 travels, such as road signs, lampposts, road marks, etc. The location of the landmarks may be generated from a historical accumulation from other vehicles driving on the same road that collect data regarding the appearance and/or location of landmarks (e.g. "crowdsourcing"). Thus, each landmark may be correlated to a set of predetermined geographic coordinates that has already been established. Therefore, in addition to the use of location-based sensors such as GNSS, the database of landmarks provided by the REM map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions and in-between landmarks. For example, ego motion obtained from processing of a plurality of images can be used to determine the location of the vehicle and certain locations of the vehicle. Ego-motion signals from sensors on board the vehicle or from images tend to show a cumulative drift, and is thus used in REM in conjunction with the landmarks (that are associated with a predefined location) to correct for ego-motion errors. This configuration is used to maintain localization error at a level that is suitable for AV/ADAS control functions.

Furthermore, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks and in-between landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the REM map data is generally constructed as part of a series of steps, which may involve any suitable number of vehicles that opt into the data collection process. For instance, Road Segment Data (RSD) is collected as part of a harvesting step. As each vehicle collects data, the data is then transmitted to the cloud or to another suitable external location as data points. A suitable computing device (e.g. a cloud server) then analyzes the data points from individual drives on the same road, and aggregates and aligns these data points with one another. After alignment has been performed, the data points are used to define a precise outline of the road infrastructure and of the drivable paths or target trajectories. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the REM map data. This information is then compiled into a roadbook map, which constitutes a bank of driving paths, semantic road information such as features and objects, and aggregated driving behavior.

A map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the REM map data, which includes data relating to the position, in a reference coordinate system, of various landmarks such as items, including roads, water features, geographic features, businesses, points of interest, restaurants, gas stations, etc.

The map database 204 may thus store, as part of the REM map data, not only the locations of such landmarks, but also descriptors relating to those landmarks, including, for example, names associated with any of the stored features, and may also store information relating to details of the items such as a precise position and orientation of items. In some cases, the REM map data may store a sparse data model including polynomial representations of certain road features (e.g., lane markings) or target trajectories for the vehicle 100. The REM map data may also include stored representations of various recognized landmarks that may be provided to determine or update a known position of the vehicle 100 with respect to a target trajectory. The landmark representations may include data fields such as landmark type, landmark location, etc., among other potential identifiers. In some embodiments, the REM map data may also include non-semantic features including point clouds of certain objects or features in the environment, and feature point and descriptors.

The map database 204 may be augmented with data in addition to the REM map data, and/or the map database 204 and/or the REM map data may reside partially or entirely as part of the remote computing system 150. As discussed herein, the location of known landmarks and map database information, which may be stored in the map database 204 and/or the remote computing system 150, may form what is referred to herein as "REM map data" or "roadbook map data." Thus, the one or more processors 102 may process sensory information (such as images, radar signals, depth information from LIDAR or stereo processing of two or more images) of the environment of the vehicle 100 together with position information, such as GPS coordinates, a vehicle's ego-motion, etc., to determine a current location and/or orientation of the vehicle 100 relative to the known landmarks by using information contained in the roadbook map. The determination of the vehicle's location may thus be refined in this manner. Certain aspects of this technology may additionally or alternatively be included in a localization technology such as a mapping and routing model.

This may allow a great deal of flexibility with respect to the type of data that may be used to perform intelligent warning generations as discussed herein with respect to VRUs. For instance, the map database 204 may additionally or alternatively store lane information, sometimes referred to as lane assignment information, which may be referenced with a current position of the vehicle 100 to identify, for example, whether the current lane may be used (legally or physically) to turn at the next intersection. The map database 204 may additionally or alternatively include information that may be crowdsourced from other vehicles driving on the same road, which may then be aggregated and used to identify useful metrics such as average vehicle turning radii at specific intersections or other suitable locations. In this way, the host lane of the vehicle 100 may be utilized to determine whether a turn is permissible for the vehicle's current lane and, if so, the average turning radius used by other drivers. As one example, the warnings may be generated in an improved manner using this information to ensure better compliance with the ECE151 regulation, which identifies the turn radius as one of the parameters for regulatory compliance.

Safety Driving Model

The safety system 200 may implement a safety driving model or SDM (also referred to as a "driving policy model," "driving policy," or simply as a "driving model"), e.g., which may be utilized and/or executed as part of the ADAS system as discussed herein. By way of example, the safety system 200 may include (e.g. as part of the driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable operations as further discussed herein. This navigation may optionally include adjusting one or more SDM parameters, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. Thus, the vehicle 100 may utilize the environmental model to perform various navigation-related operations within the framework of the driving policy model.

The navigation-related operation may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular driving scenario. The navigation-related operations may thus cause the vehicle 100 to execute a specific action based upon the environmental model to comply with the SDM parameters defined by the SDM model as discussed herein. For instance, navigation-related operations may include steering the vehicle 100, changing an acceleration and/or velocity of the vehicle 100, executing predetermined trajectory maneuvers, etc. In other words, the environmental model may be generated using acquired sensor data, and the applicable driving policy model may then be applied together with the environmental model to determine a navigation-related operation to be performed by the vehicle.

VRU Collision Warning System Implementation and Regulations

Again, as a general matter of safety as well being the goal of other proposed regulatory requirements such as the UNECE proposed ECE151 regulation, it is desirable to detect and issue adequate warnings upon detecting a potential collision between the vehicle 100 and a VRU. However, current techniques to warn driver's regarding VRUs only calculate the position of the VRU in the front of the vehicle, and thus provide a warning only when an imminent collision is detected. Therefore, these current systems fail to meet the safer guidelines required by the ECE151 regulation. As further discussed herein, the embodiments address these issues by providing more relevant and intelligent warnings regarding potential VRU collisions.

For example, such collisions may occur when an aforementioned long vehicle makes a right or left turn (or otherwise shifts laterally) across a designated bicycle lane. Thus, the aspects described herein function to warn a driver of a vehicle 100 (which may comprise such an aforementioned long vehicle) regarding an impending collision with a VRU to prevent these and other types of collisions. This may include detecting a potential collision using one or more onboard vehicle sensors such as LIDAR, RADAR, acquired images, etc., to detect and classify an object as a VRU, which may include image processing techniques from acquired images as further discussed herein. Once the VRU is identified, the position and speed of the VRU relative to the vehicle 100 may be computing using any suitable techniques, including known techniques. For example, metrics such as a lateral distance and/or longitudinal distance between the vehicle 100 and the VRU may be determined based upon the onboard vehicle sensor data.

A potential collision between the vehicle 100 and the VRU may then be computed for a future time period based upon the metrics meeting any suitable threshold conditions (e.g. the lateral and/or longitudinal distances being less than respective thresholds). Moreover, if these conditions are met, a projected future time period for a potential collision may then be computed based upon these metrics using the current speed of the vehicle 100, the speed and position of the VRU with respect to the vehicle 100, and information specific to the vehicle such as the aforementioned turning radius. Further by way of example, to guarantee safety, in any potential collision determination a worst case scenario can be used for a response time period. Thus for example, instead of assuming that the VRU (say an e-bike) maintains constant speed during a response time (the time between detection of the VRU and the application of the proper response), it may be assumed that the VRU accelerates (or brakes or steers, depending on the scenario) at a maximum rate. The maximum rate can be predefined, and may depend for example on the type of VRU (for example, a pedestrian, a cyclist, etc.) The maximum rate can be such that it is intended to reflect a typical (maximal) behavior of a typical object of this type.

If the future time period for the potential collision is less than a defined threshold time period, then the vehicle 100 may generate a warning or, as further discussed herein, execute other actions such as causing the vehicle 100 to perform a navigational change to prevent or further delay the potential collision. Thus, the aspects as described herein function to satisfy the requirement so the ECE151 regulation, which requires such warnings to be issued for specific types of vehicles with respect to blind spot detection of VRUs. Furthermore, the aspects as described herein function to improve upon the use of conventional systems that meet regulatory requirements by providing more relevant warnings by leveraging the REM map data, as further discussed herein.

It is noted that the aspects as described herein are not limited to this particular example, and any suitable number and/or type of metrics may be used to determine if and when a warning needs to be generated to the driver of the vehicle 100 and/or to cause a navigational change in the vehicle 100. Thus, although the aspects described herein are described with reference to the metrics implemented via the ECE151 regulation, this is by way of example and not limitation, and any suitable set of metrics and/or scenarios may be used to trigger the issuance of a warning to the driver of the vehicle 100 and/or to cause a navigational change in the vehicle 100, in addition to or instead of those identified in the ECE151 regulation.

With respect to specific regulatory requirements, the ECE151 regulation as noted herein requires specific types of vehicles to provide a warning to the driver if the VRU can be impacted within a future predetermined threshold time period, which is currently defined as the next 4 seconds as of the time of this writing. Thus, the 4 second threshold is used as an example, although the aspects described herein may be adapted to any suitable threshold to determine if a warning or other suitable action is needed. For example, the ECE151 regulation provides in Section 5.3.1.4 as follows (current proposal as of this writing):

5.3.1.4. The BSIS shall give an information signal at last point of information, for a bicycle moving with a speed between 5 km/h and 20 km/h, at a lateral separation between bicycle and vehicle of between 0.9 and 4.25 metres, which could result in a collision between bicycle and vehicle with an impact position 0 to 6 m with respect to the vehicle front right corner, if typical steering motion would be applied by the vehicle driver.

The information signal shall not be visible before the first point of information. It shall be given between the first point of information and the last point of information.

It shall also give an information signal for a bicycle moving with a speed between 5 km/h and 20 km/h, at a lateral separation of between 0.25 m up to 0.9 m and longitudinally located between [−0.6 and +0.6 m] in reference to the centre of the most forward front wheel while driving straight.

However, the information signal is not required when the relative longitudinal distance between bicycle and front right corner of the vehicle is more than 30 m to the rear or 7 m to the front."

Thus, the ECE151 regulation requires that a warning (i.e. the information signal as noted above) be provided to a driver of a vehicle when (1) a VRU is moving between 5 km/h and 20 km/h, (2) the VRU is 30 meters or less behind the vehicle 100 or 7 meters or less in front of the vehicle 100, and (3) the lateral separation between the vehicle 100 and the VRU is between the stated 0.9-4.25 meters. The warning in this example is provided by detecting a collision as a result of the vehicle making a right or left hand turn.

Figure 6A:
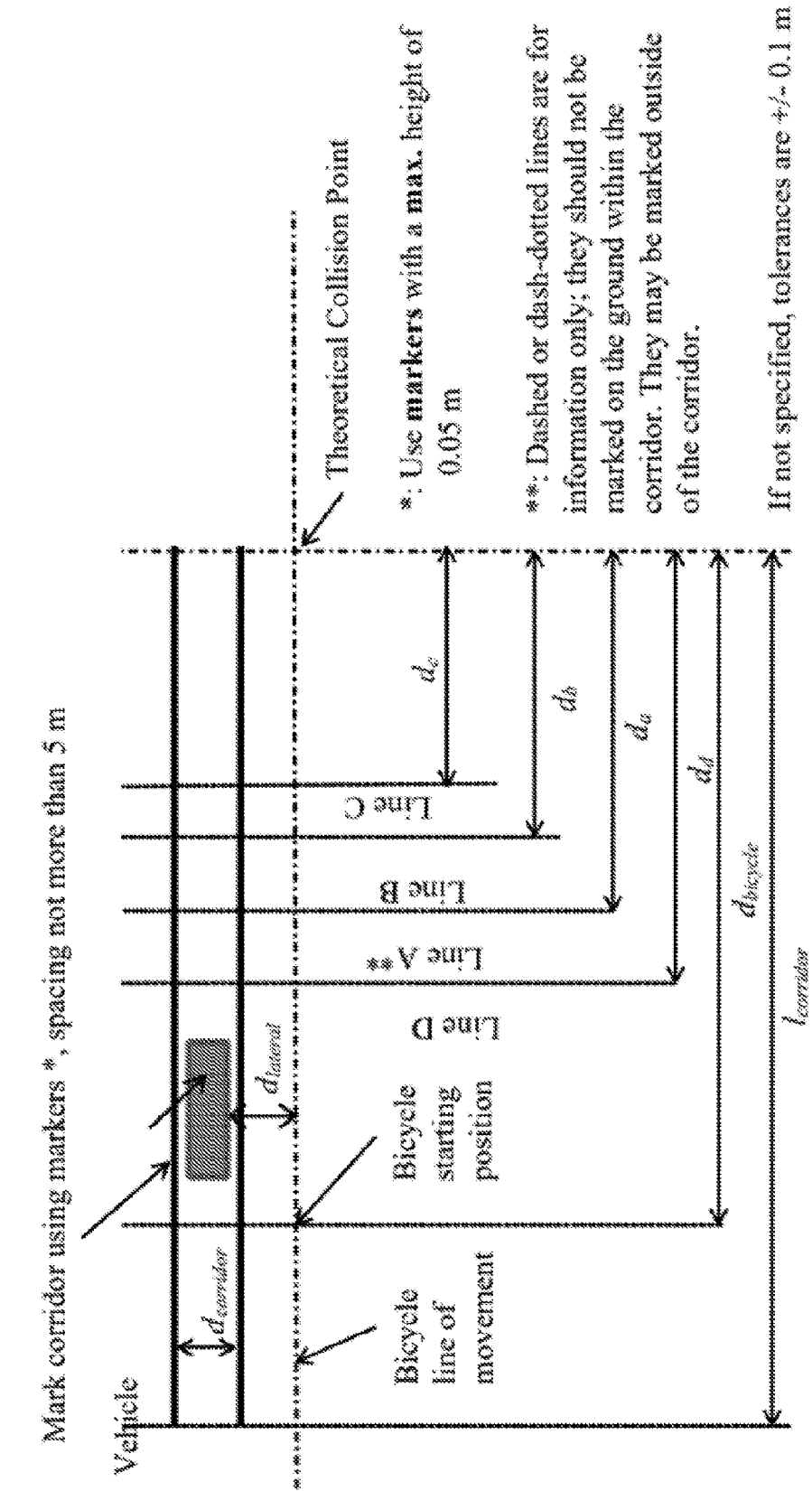
FIG. 6A illustrates a test scenario for a vehicle determining a theoretical collision point with a vulnerable road user (VRU) as defined by the United Nations Economic Commission for Europe (UNECE) regulation ECE151.

To simplify the manner in which the ECE151 regulation may be tested for conformance, the vehicle 100 is assumed to be driven parallel to a VRU, with any warnings being generated 4 seconds prior to a theoretical impact. In other words, a warning will be generated in accordance with the ECE151 regulation when, during the next 4 seconds, the vehicle 100 will make a turn with a certain radius as illustrated in FIG. 6A. FIG. 6B illustrates a table with data corresponding to different test cases corresponding to the scenario shown in FIG. 6A. It is noted that the most recent version of the ECE151 regulation at the time of this writing also provides a test procedure for vehicles to pass this regulatory requirement using a turning scenario. Such regulations (e.g. ECE151 or other regulations) may require vehicles, when required to turn, to provide early warnings before the turn. The aspects as described herein may be implemented to enable vehicles to pass such testing requirements.

The ECE151 regulation as noted herein thus provides various safety parameters, which are used as an example herein to illustrate how, when this standard is met, collisions between VRUs and the vehicle 100 may be prevented. Again, the aspects as described herein may adopt these parameters as a matter of convenience and/or to ensure regulatory compliance. However, the aspects as described herein may use additional or alternate metrics as part of the VRU collision warning system.

Enhanced VRU Collision Avoidance Warning System

The aspects as described herein implement the safety system 200, which leverages the REM map data to intelligently make the determination of whether a warning signal needs to be issued or other action be taken based upon a detected driving scenario. Such scenarios may be defined, for instance, based upon any suitable combination of factors that define a particular driving situation and/or condition. For example, a driving scenario may be defined by the geographic region of the vehicle 100, which may include a particular zone (e.g. a school zone) or geographic region, and which may include a particular state of the vehicle 100, roadways, lanes, and/or the VRU in that geographic region. As additional examples, driving scenarios may be additionally or alternatively defined by way of the sensed surroundings of the vehicle 100, which may be via the sensors identified with the safety system 200 and/or via the information derived from the REM map data, the position of the VRU with respect to the vehicle 100, the detected speed of the VRU, the date and/or time of day, the type of road, whether the vehicle 100 is approaching (e.g. is within a threshold distance of) an intersection of roads, the turning radius of the vehicle 100 and/or other vehicles of similar size or type as the vehicle 100 (e.g. within a threshold of 5%, 10%, etc.), etc. The determination of any of the various factors used to identify a particular driving scenario may be performed via the use of any suitable combination of the sensors used by the safety system 200, other suitable vehicle-based sensors, and/or the REM map data (or any other appropriate AV map used for vehicle localization and control) as noted above, which allows the vehicle 100 to determine its geographic location with respect to recognized landmarks in a fast and accurate manner, as well as the availability of other relevant information that has been received and aggregated as part of the aforementioned crowdsourcing process.

For instance, by using geo-localization and the REM map data, the safety system 200 may determine whether the ego-lane (the lane currently used by the vehicle 100) is a turn lane or whether a turn is possible and/or permitted. Furthermore, the distance between a vehicle lane and a bike lane (i.e. a lateral distance between the two lanes) may be accurately calculated. Using this information, the safety system 200 may determine whether the vehicle 100 is capable of making a turn and, if so, generate a suitable warning, determine whether the vehicle 100 should take the turn, optionally suggest a safe/safer maneuver through the turn, and additionally or alternatively control the vehicle 100 to execute a safer turn.

For instance, to provide an effective warning, the radius of the turn performed by the vehicle 100 and the maneuver of the turn needs to be known to determine if the VRU will have time to safely cross given a current trajectory of the vehicle 100. The current trajectory of the vehicle 100 may be identified from a current route implemented by the vehicle 100, which may be in accordance with any suitable routing system implemented the safety system 200. Alternatively, the trajectory of the vehicle 100 may be determined via an analysis of the location and trajectory of the vehicle 100 while driving. For example, the vehicle's location within the road may be ascertained using the REM map data to identify whether the vehicle 100 is in a turn lane or if a turn is even possible. For example, for an impact to occur with a VRU, lateral movement of the vehicle 100 needs to be detected. This lateral movement may be represented by either a lane change of the vehicle 100 or the vehicle 100 making a left or right hand turn. The aspects as described herein facilitate the safety system 200 (e.g. via the one or more processors 102) determining whether the vehicle 100 is going to perform a maneuver that results in a lateral shift of the vehicle 100 (which may include a lane-shifting or turning maneuver) and/or if the vehicle 100 is capable of performing such a maneuver within a predetermined threshold time period (e.g. the ECE151 regulation requirement of 4 seconds).

In this way, the aspects described herein act to minimize or at least reduce the occurrence and number of false warnings/interventions, leading to more attentive drivers and thereby improve VRU safety. To do so, the aspects described herein are directed to the implementation of a VRU collision avoidance system, which functions to provide any suitable type of warning (e.g. visual, audio, haptic, etc.) to the driver of a vehicle in response to the detection of a potential collision of the vehicle with a VRU. Again, such warnings may be implemented by way of the vehicle components 230 as noted above. Moreover, the determination of whether a potential collision exists, and thus a warning should be issued, may be performed in accordance with the safety system 200 and/or any suitable combination of components thereof. For instance, the one or more image acquisition devices 104 may comprise cameras, each being configured to acquire frames of images over time corresponding to a respective field of view, which may contain a region of interest (ROI) therein. Each camera may thus acquire images in accordance with a respective FoV that is based upon the position and orientation of each camera on the vehicle 100. Furthermore, the one or more processors 102 may perform any suitable type of image processing operations on the entirety of or, alternatively, portions of the ROI within the image frame(s) acquired via each of the cameras to detect and classify objects such as VRUs, as well as identify the speed, distance, and orientation of the VRUs with respect to the vehicle. Such processing techniques may be carried out in accordance with any suitable techniques, including known techniques, and may be executed in accordance with a suitably trained system of which the one or more processors 102 and/or the safety system 200 form(s) a part. This process may require a certain period of time to complete. In addition, issuing instructions to other components such as an ECU and/or mechanical components of the vehicle may aggregate to a "response time," which, in some embodiments, can be accounted for, as mentioned above, when determining whether to issue a warning or not or when determining a proper response to a given situation.

In some embodiments, in addition or as an alternative to providing a warning to the driver, the safety system 200 cause the vehicle 100 to execute one or more actions resulting in a navigational change of the vehicle 100, or any other suitable change. For example, the safety system 200 may analyze data collected via the safety system 200 with respect the current route, trajectory, and/or position of the vehicle 100 as well as the speed, distance, and orientation of the VRU to determine whether the vehicle 100 should execute a certain action, and then automatically take the determined action without human intervention. As an illustrative example, in response to recognizing that a VRU is on a possible collision course with the vehicle, the safety system 200 may automatically control the braking, acceleration, and/or steering of the vehicle 100 to cause a navigational change in the vehicle 100 such that the collision is prevented. Again, this may be implemented via the one or more processors 102 configured as a controller, which generates control signals that are then transmitted to the appropriate vehicle components such as a throttling system, a braking system, a steering system, etc. The control of the vehicle 100 in this manner may, for example, be in accordance with the SDM of the vehicle 100 as noted above, such that the new vehicle trajectory meets the defined SDM parameters with respect to maintaining safe driving.

In any event, the embodiments as discussed herein implement localization-based techniques in conjunction with other sensor-based techniques (such as the aforementioned image processing) to advantageously anticipate the level of risk of a potential collision with a VRU. Based upon the level of risk that is anticipated in this manner, the safety system 200 may respond in various ways, the details of which are further discussed below. For instance, the VRU warning system aspects as described herein may implement different warning profiles based upon predefined driving scenarios that are recognized by the safety system 200.

As one illustrative example, one warning profile may correspond to a driving scenario in which the vehicle 100 is travelling at a velocity that is less than a predetermined threshold velocity. As the conditions and/or driving scenarios change, the safety system 200 may then adapt to a new warning profile. For instance, and to provide another illustrative example, a further warning profile may correspond to a driving scenario in which the vehicle 100 is turning or a turning maneuver is planned as part of the current vehicle trajectory. Thus, the aspects described herein may implement the use of the REM map data to distinguish between certain driving scenarios. In contrast, conventional systems may provide VRU warnings using only sensor-based solutions, and thus result in warnings being issued too frequently, which may desensitize drivers. For example, a conventional system may implement onboard vehicle sensors to determine that the vehicle 100 is driving in a straight line, but have difficulty identifying when a turn is going to be executed from sensor data alone, as the vehicle 100 may simply be changing lanes, or a turn may not actually be possible.

Therefore, the embodiments as discussed herein implement localization techniques, which are combined with the sensor-based detection techniques described above, to provide warnings or execute other actions based upon specific driving scenarios. These driving scenarios may then be used to generate warnings and/or to filter or suppress the generation of warnings such that warnings are only issued when relevant. As one illustrative example, the safety system 200 may identify that the road has a certain curvature from the REM map data, thereby allowing the safety system 200 to intelligently distinguish between the vehicle changing yaw (which may be identified via the onboard sensors) to perform a turning maneuver, versus the vehicle 100 following the trajectory of the curve in the road without turning. In doing so, the safety system 200 may function to filter or suppress the issuance of a warning as a collision with a VRU is not imminent based upon this information, while still meeting the regulatory requirements of ECE151. As another illustrative example, the safety system 200 may utilize the REM map data to adjust the manner in which sensor data is processed to detect VRUs when approaching n intersection, thereby providing a warning earlier than would be possible using only sensor-based techniques.

Figure 3:
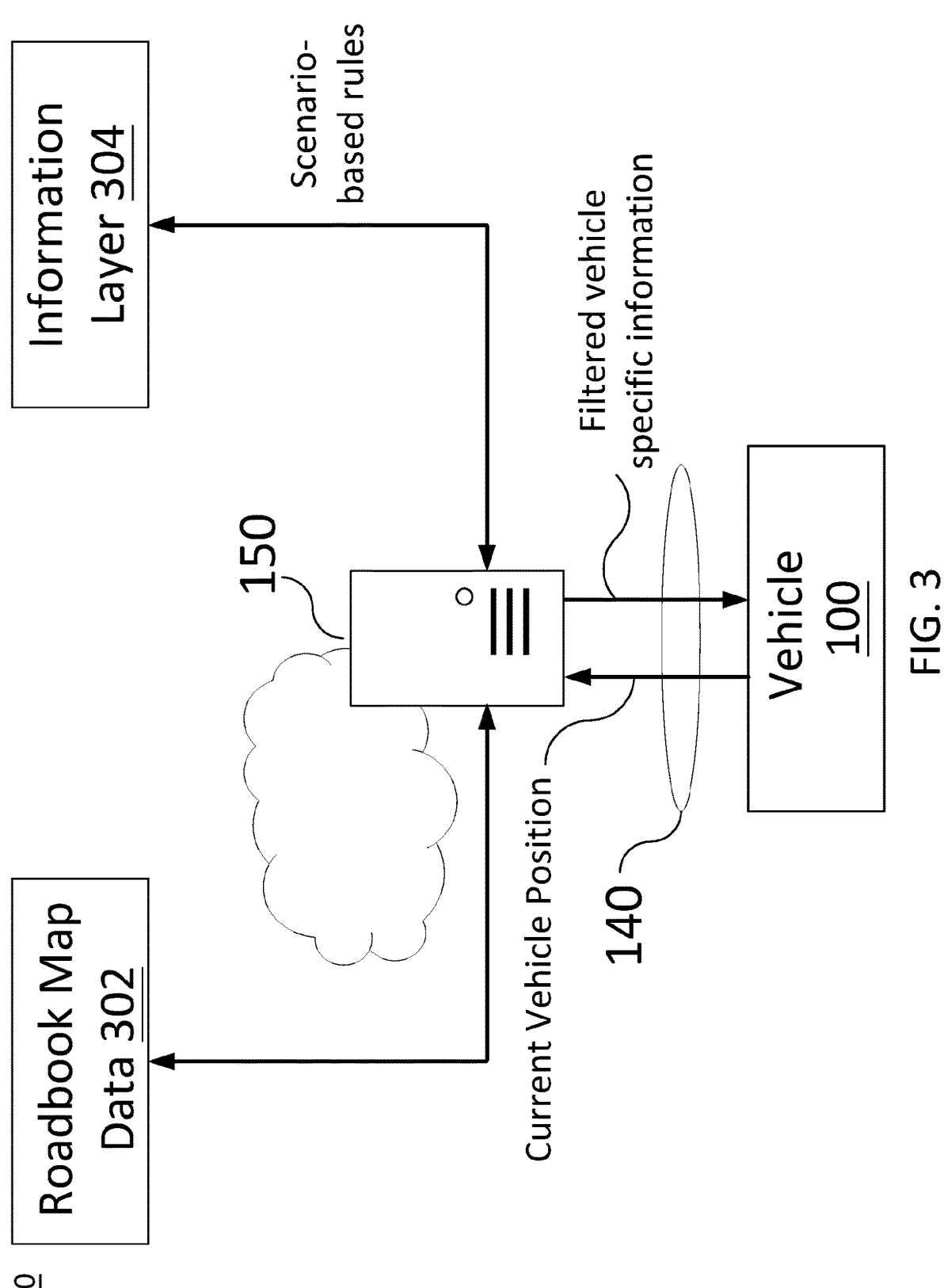
FIG. 3 illustrates an example architecture for a VRU collision avoidance system implementing map data in conjunction with sensor-based VRU detection techniques, in accordance with one or more embodiments of the present disclosure.

FIG. 3 illustrates an example architecture for implementing map data in conjunction with a sensor-based VRU collision avoidance system, in accordance with one or more embodiments of the present disclosure. The architecture 300 as shown in FIG. 3 includes the vehicle 100 and the remote computing device(s) 150, which again may be implemented as any suitable number of computing devices such as those identified with a cloud computing system, an edge network, etc. Again, the vehicle 100 is configured to communicate with the remote computing device(s) 150 via the link 140, which may represent any suitable number of communication links. Such communications may occur, for instance, via one or more of the wireless transceivers 208, 210, 212 that form part of the safety system 200, as noted above, and may be performed in accordance with any suitable type of communication protocols.

The architecture 300 as shown in FIG. 3 also includes roadbook map data 302 and an information layer 304. It is noted that the roadbook map data 302 and information layer 304 are shown in FIG. 3 as separate components, but may be implemented as part of the remote computing device(s) 150 or as one or more separate computing device(s) that may be accessed via the remote computing device(s) 150. Furthermore, the functionality as discussed herein with respect to the architecture 300 is provided with respect to specific components of the architecture 300, such as the remote computing device(s) 150, the vehicle 100, etc. However, it is noted that this is for ease of explanation, and any of the functionality as discussed herein with respect to the architecture 300 may be performed via any of the components thereof, or combinations thereof.

In any event, the roadbook map data 302 may represent a stored data set that comprises the REM map data as noted above, which again may include data corresponding to landmarks and their corresponding geographic locations, bank(s) of driving paths, roadways, semantic road information such as features and objects, and optionally also aggregated driving behavior, etc. Thus, the roadbook map data may be dynamic in nature and generated as an aggregated data set that changes over time as a result of additional data or modified data that is provided via any suitable number of other vehicles (e.g. as part of a crowdsourcing procedure). The roadbook map data 302 is thus not limited to the examples described throughout this disclosure, but may contain any suitable type of data to enable the vehicle 100 to provide VRU collision warnings in accordance with the embodiments as discussed herein.

The architecture 300 may additionally include an information layer 304, which may represent a functional layer and/or accompanying data set representing any suitable type of information that may be used by the vehicle 100 for the purpose of generating a VRU collision warning and/or executing an action based upon the type of the vehicle 100, the location of the vehicle 100, and/or the particular driving scenario identified with the vehicle 100. For instance, the information layer 304 may reference a data set that represents specific rules related to different types (e.g. classes) of vehicles, different vehicle weights, different ranges, times, and/or hours of the day, different types of predetermined geographical regions (e.g. school zones), etc. The information layer 304 may reference a data set that instructs or otherwise enables the vehicle 100 to issue a VRU collision warning when the various conditions reported by the vehicle match those identified in the referenced data set. These various rules may be referred to herein as "scenario-based rules."

To do so, the remote computing device(s) 150 may receive a current position of the vehicle 100, which may be determined by the vehicle 100's one or more position sensors 106. Thus, the vehicle 100 may transmit geographic coordinates to the remote computing device(s) 150 in a continuous manner, upon request, or in accordance with any suitable transmission schedule. The remote computing device(s) 150 may then correlate the current location of the vehicle 100 to the same geographic location in the REM data accessed via the roadbook map data 302. The remote computing device(s) 150 may transmit the relevant REM map data (i.e. REM map data that includes the current location of the vehicle 100) over any suitable geographic region, which may depend upon the configuration of the safety system 200 and the particular application. For instance, the one or more memories 202 may be configured to store REM map data in the map database 204 over an entire city, state, etc., or alternatively may store the REM map data for a smaller region and more frequently download the REM map data from the remote computing device(s) 150. Thus, the size of the geographic area of the REM map data provided to the vehicle 100 encompasses the current location of the vehicle 100 in any event, but may be more or less frequently transmitted to and/or downloaded by the vehicle 100.

Moreover, the remote computing device(s) 150 may implement the information layer 304 to provide the vehicle 100 with the scenario-based rules based upon any suitable number of vehicle-based parameters. For example, the scenario-based rules may be provided with respect to a particular geographic region corresponding to the REM map data stored in and/or downloaded by the vehicle 100, as noted above. As another example, the scenario-based rules may be transmitted to the vehicle 100 in a selective manner such that the scenario-based rules include only those rules that are relevant to the vehicle 100 based upon the vehicle type and/or the vehicle's current location. As another example, the vehicle 100 may download the scenario-based rules for any suitable number of vehicle types and/or driving scenarios, and locally determine which of the scenario-based rules are relevant locally based upon any suitable number and/or type of vehicle parameters as noted herein such as the vehicle class, weight, time of day, road type, etc.

In any event, the REM map data and the scenario-based rules provided to the vehicle 100 in this way via the architecture 300 enable the vehicle 100 to determine when to issue a VRU collision warning and/or execute another action such as a navigational change in accordance with the embodiments described herein. Again, this may be implemented by the safety system 200, e.g. the one or more processors 102 of the safety system 200. Thus, the embodiments as described herein may be executed as a VRU collision warning algorithm via software (e.g. the one or more processors 102 executing instructions in a relevant memory accessed by the one or more processors 214A, 214B, 216, 218, such as the one or more memories 202). As another example, the embodiments as described herein may be executed via a hardware solution (e.g. via the one or more processors 102 implemented as an application specific integrated circuit), or combinations of hardware and software implementations.

Thus, the embodiments described herein enable a VRU collision warning system that leverages both localization techniques (e.g. using the REM map data) and sensor-based techniques in combination with scenario-based rules on a per-vehicle basis. This results in a more intelligent VRU collision warning being issued and/or action being taken that is more relevant to the particular vehicle location and scenario.

Furthermore, and because the scenario-based rules data may be tailored to a wide range of different vehicle and scenario types, the embodiments described herein also advantageously allow for VRU collision warnings to be tailored to increase the sensitivity of VRU collision warnings and/or the navigational control when it is desirable to do so. As used herein, the "sensitivity" of the VRU collision warnings may be controlled via an adjustment of any suitable type and/or number of metrics, the manner in which computation using such metrics are performed, and/or the manner in which any suitable portions of the VRU detection, warning generation, and/or control of the vehicle 100 are executed that results in the triggering of a warning to be issued and/or a navigational change in the vehicle 100.

For example, the sensitivity of the VRU collision warnings may be considered to be increased by decreasing the threshold level of vehicle lateral movement, by decreasing the threshold lateral distance between the vehicle 100 and a VRU, by decreasing the front or rear distances between the vehicle 100 and the VRU, by increasing the threshold projected collision time, etc. It is noted that the sensitivity of the VRU collision warnings may, for example, be adjusted by adjusting any of the regulatory ECE151 metrics as noted herein in a manner that is stricter or otherwise deviates from those defined by the ECE151 (or other) regulatory requirements. The adjustment of these various metrics and/or the manner in which a potential collision is calculated may be based upon the particular driving scenario, which may include the particular geographic region, the time of day, etc.

Thus, the safety system 200 may utilize the information received from the remote computing device(s) 150, such as the scenario-based rules and REM map data, to determine how to adjust the manner in which the VRU collision warnings and/or a navigational change in the vehicle 100 is/are triggered. To provide an illustrative example, in the case of city bus or other vehicle that drives along a predetermined route, the current location of the vehicle 100 may be identified with a predetermined geographic region or zone, which may define a driving scenario when the vehicle is located along this route. Thus, a potential collision may be identified by projecting the trajectory and direction of the vehicle 100 along the known route for a particular geographic region.

As another illustrative example, more sensitive warnings may be enabled when the vehicle 100 is located in a school zone and the time and date indicates that school is in session. This may include, for example, increasing the threshold projected collision time. In doing so, a potential collision with a VRU may be detected with higher sensitivity, thereby providing a warning and/or causing a navigational change in the vehicle 100 earlier than would otherwise occur.

As yet another illustrative example, the scenario-based rules may be implemented by the safety system 200 to provide more sensitive warnings when the REM map data indicates a "hot spot," i.e. a region in which collisions with VRUs are more likely or have occurred with a greater frequency in the past from the use of the crowdsourced REM map data as noted herein. As another illustrative example, the sensitivity of the VRU collision warnings may be reduced in other driving scenarios, such as when the VRU is located within a protected lane that is physically separated from the vehicle lanes (e.g., bike lanes for which are raised, separated via a physical barrier, implemented as a dedicated overpass or underpass bypassing a potential intersection with motorized vehicles, etc.), as this provides additional VRU protection.

It is noted that the particular driving scenario may be utilized to leverage the adjustment of the sensitivity of any portion of the VRU detection, warning generation, and/or vehicle navigational control processes, which may include how the trained systems perform classification and/or object detection. For example, the sensitivity may be adjusted in accordance with any combination of the techniques as discussed herein in response to a determination (e.g. via the safety system 200 or other suitable components of the vehicle 100) that the vehicle 100 is capable of and/or permitted to make a turn and also is intending to make a turn, which again may be determined via trajectory data, routing data, etc. In this way, the sensitivity of the warning generation and/or navigational control may be increased only when it is known that the vehicle is actually going to execute a turning maneuver.

For example, by adjusting the sensitivity of the VRU detection algorithms (or trained systems) as noted herein the VRU collision warnings, at least in some cases, may be issued when a warning would have otherwise been suppressed or not issued. The increased sensitivity may be used with respect to the detection of suspected VRUs and/or with respect to the existence of a potential risk due to the relative position of the detected VRU or its behavior. Thus, and to provide an illustrative example, if a confidence level associated with the classification of an object in an image as a cyclist is relatively low (but still exceeds a predetermined threshold) then in some scenarios (e.g. the vehicle 100 is not about to turn), then the object would not be classified as a cyclist. However, in a different driving scenario in which an upcoming turn is planned or otherwise known, the safety system 200 may adjust the settings configurations applied in such situations, and as a result may classify the object as a cyclist.

In a further example, given an upcoming turn scenario, the settings or configuration adjustments may be made with respect to a pedestrian that is detected in the scene but is determined to be moving along a trajectory having a relatively low likelihood (but still exceeds a predetermined threshold) of intersecting with the vehicle 100 or an impact zone associated with the trajectory of vehicle 100. As a result, the safety system 200 may still cause a warning to be issued to alert the driver of the potential (though less likely) danger. In yet another example, a danger zone which constitutes the area in a vicinity of the vehicle where it is considered to be dangerous for a VRU to be located or for an estimated trajectory of a VRU to cross the estimated trajectory of the host vehicle can be increased or otherwise modified (e.g., in shape) in an upcoming turn scenario. A danger zone such as used here can be used by some driving policies, SDMs, by RSS, etc. It is to be appreciated that such an increased sensitivity capability may be useful in situations in which an unexpected or erratic behavior of an object of interest (e.g., pedestrian or cyclist) may cause a hazardous situation.

Embodiments include utilizing any suitable number of increased sensitivity settings, metrics, configurations, etc., for different objects. To provide an example, for cyclists the adjustment may be greater or of a different type than the adjustment that is made for pedestrians. In this way, in the case of an upcoming turn (which the system has foreknowledge about) and a suspected cyclist is detected, the specific cyclist-based configuration settings may be applied. However, it may also be established that even in cases where an upcoming turn is not detected, the sensitivity may still be adjusted based upon any other suitable conditions.

Example Driving Scenarios

As noted above, the REM map data may be utilized by the safety system 200 to track the current road position of the vehicle with respect to various objects, road features, identified landmarks, etc. Thus, the REM map data may be utilized by the safety system 200 determine the geolocation of the vehicle on the road with high accuracy, which may be leveraged to determine various conditions. For example, a determination may be made regarding whether the vehicle 100 is currently driving in a straight road with no possibility to turn, whether there is the possibility to turn because the vehicle 100 occupies a turn lane or is positioned within a left or right lane with an adjoining crossroad for which a turn in each respective direction is possible, if the next turn is legally permissible, the turning radius of the vehicle 100 (which may be calculated or known a priori), whether a traffic light is positioned at the next available turn, etc. Moreover, and as noted above, the safety system 200 may detect a speed and position of the VRU with respect to the vehicle 100 based upon acquired sensor data, which may include image processing of acquired image frame(s).

Using this information, the aspects as described herein may generate a warning and/or execute a navigational change in the vehicle 100 based upon any suitable set of metrics, as noted herein. For instance, the vehicle 100 may generate a warning and/or execute a navigational change based upon when a possible collision between the vehicle 100 and a VRU is detected to occur within a future time period. Again, these metrics may consider, for instance, the position and/or speed of the vehicle 100, as well as the position and/or speed of the VRU relative to the vehicle 100. This may include identifying scenarios in which the VRU is located within a lateral distance, in front of, or behind the vehicle 100 that are less than predetermined threshold distances and/or relative speeds with respect to the vehicle 100 that are greater than predetermined speed thresholds. Thus, the safety system 200 (e.g. via one or more processors 102) may calculate a "projection" of where the VRU will be over a period of time (e.g. the ECE151 defined 4 seconds), whether the VRU's current speed is greater than the vehicle 100, and whether this projection (when correlated to the current speed and trajectory of the vehicle 100) may potentially result in a collision between the vehicle 100 and the VRU within a future time period that is less than a defined threshold time period noted herein.

Thus, the aspects as described herein may generate a warning and/or execute a navigational change in the vehicle 100 for a driving scenario in which the vehicle 100 is capable of executing a turning maneuver from a current lane that would result in a potential collision between the vehicle and the VRU based upon the geographic location of the vehicle, and the potential collision between the vehicle and the VRU is detected to occur within a subsequent time period that is less than a threshold time period. This threshold time period may represent, for example, the 4-second projected collision time specified by the ECE151 regulation as noted herein, or any other suitable time period. The safety system 200 may determine whether the vehicle is capable of executing a turning maneuver based upon the REM map data, which may identify a current lane position of the vehicle, and may indicate that a turn in front of the VRU is or is not possible, as discussed herein.

Again, the safety system 200 may adjust the manner in which a warning is issued and/or a navigational change in the vehicle 100 is executed based upon the particular driving scenario. As an example, for the same distance and varying speeds between the vehicle 100 and the VRU, the safety system 200 may intelligently adapt the need to issue a warning and still satisfy ECE151 regulations, as a theoretical collision is not possible in some instances. As another example, when the vehicle 100 is capable of making a turning maneuver, the safety system 200 may provide a warning in accordance with ECE151 regulations based upon the speed and trajectory of the vehicle 100 and the speed and position of the VRU with respect to the vehicle 100.

However, for another scenario in which the speed and position for the VRU with respect to the vehicle 100 are the same as previously described (i.e. for the turning scenario), the safety system 200 may not generate an alert when the vehicle 100 is unable to make a turning maneuver (due to the road layout, the position of the vehicle, etc.), or does not intend to make a turning maneuver (e.g. as indicated by current routing data). In this way, the aspects described herein facilitate the vehicle 100 adjusting the sensitivity of the warnings based upon the particular driving scenario.

Figure 4:
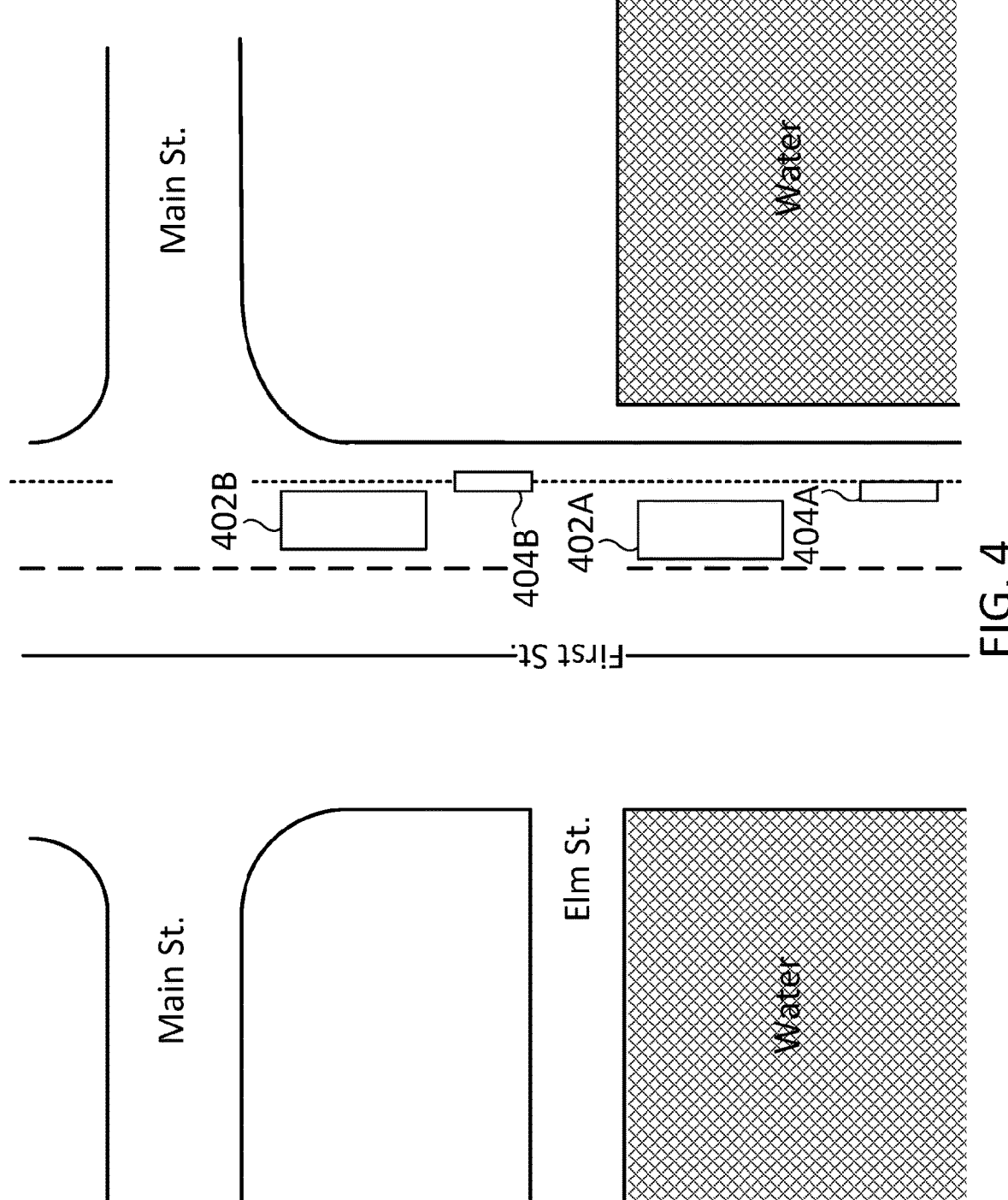
FIG. 4 illustrates two different example driving scenarios for which VRU collision warnings may be generated, in accordance with one or more embodiments of the present disclosure.

For example, FIG. 4 illustrates two different example scenarios for which VRU collision warnings may be issued, in accordance with one or more embodiments of the present disclosure. As shown in FIG. 4, each of the vehicles 402A, 402B are driving down First St. Each of the vehicles 402A, 402B as shown in FIG. 4 may implement the enhanced VRU collision warning system as discussed above with respect to the vehicle 100. A VRU 404A is located behind the vehicle 402A, and a VRU 404B is located behind the vehicle 402B. In this example, it is assumed that the VRU 404A is located an adequate distance from the vehicle 402B such that the vehicle 402B need not issue a VRU collision warning for the VRU 404A. Likewise, it is assumed that the VRU 404B is located an adequate distance from the vehicle 402A such that the vehicle 402A need not issue a VRU collision warning for the VRU 404B. In other words, for ease of explanation, the vehicle and VRU pairs are considered separate from one another.

With continued reference to FIG. 4, the vehicle 402A and the VRU 404A are driving in the same direction as one another, and the VRU 404A is located behind the vehicle 402A. Thus, in this current scenario, the risk of collision between the vehicle 402A and the VRU 404A is low, particularly because the vehicle 402A is incapable of making a turn. However, regulatory or other requirements typically require a VRU warning to be issued once the distance between the VRU 404A is less than a predetermined threshold distance from the rear of the vehicle 402A. In other words, conventional techniques may issue a VRU collision warning to comply with regulatory requirements when any lateral movement of the vehicle is detected, despite the probability of a collision being low due to the lack of the vehicle 402A being able to execute a turning maneuver.

However, the VRU 404B and vehicle 402B are also driving in the same direction, with the VRU 404B being located behind the vehicle 402B. However, in this scenario the risk of collision is higher because the vehicle 402B is capable of making a turn in the junction (intersection) of Main St. and First. St. Thus, the embodiments as described herein may result in the safety system 200 identifying these different levels of risk based upon the capability of the vehicle to turn in one scenario versus the other, and issuing the VRU collision warning only when the vehicle is actually capable of making a turning maneuver that would result in a possible collision with the VRU.

Selective Image Processing Adjustment

The aspects described herein may additionally make use of the REM map data to enhance the manner in which the sensor-based processing is performed, thereby improving upon the accuracy in which the position and speed of the VRU is detected with respect to the vehicle 100. Thus, and as noted above with respect to the adjustment in the manner in which the VRU warnings and/or navigational change may be determined, embodiments additionally or alternatively include the safety system 200 adjusting the manner in which the sensor data is processed to detect VRUs based upon the particular driving scenario, which again may include a vehicle's predetermined geographic region, the time of day, etc.

For instance, a known technique includes the use of yaw information to increase the region of interest in acquired image frames used for image processing to detect and classify objects such as VRUs. The yaw information may be derived from any suitable components of the safety system 200 or combinations thereof, such as onboard sensors that may include one or more accelerometers, gyro sensors, etc., as noted above. Additionally or alternatively, yaw information may be obtained via the status of turn signals, a change in steering wheel angle that may be received from a CAN bus of the vehicle 100, a sensor attached to the steering column of the vehicle 100, which provides a measure of steering column angular position/velocity as the vehicle 100 turns left or right, etc. Still further, and as another option in addition to or as an alternative to the aforementioned techniques of obtaining yaw information, the yaw information may be derived from a trajectory obtained from the REM map data. For instance, a trajectory of the vehicle may be obtained via the REM map data based upon the particular geographic location of the vehicle 100 with respect to a predetermined trajectory that may be identified from a known route or planned vehicle path. In this way, the yaw information may be derived by comparing the vehicle's location to the trajectory obtained from the REM map data and identifying the corresponding yaw information at that point in the trajectory. Additionally or alternatively, such yaw information may be derived from image processing, e.g. by processing the motion in acquired image frames. The analysis may include identifying an object in the at least two image frames and determining that the object has shifted or moved position. This determination may compare, for example, the position of the object relative to a center point or edge of the at least two image frames.

In any event, the safety system 200 (e.g. the one or more processors 102) may set a region of interest in the image frame(s) acquired via each of the cameras of the vehicle 100 responsive to the yaw information. For instance, if the vehicle 100 is turning right (e.g. the yaw information indicates a yaw to the right in excess of a threshold), then the one or more processors 102 are configured to perform the image processing on a wider portion of a region of interest for cameras associated with the right side of the vehicle 100 for the detection and classification of VRUs. As another example, if the vehicle 100 is turning left (e.g. the yaw information indicates a yaw to the right in excess of a threshold), then the one or more processors 102 are configured to perform the image processing on a wider portion of a region of interest for cameras associated with the left side of the vehicle 100 for the detection and classification of VRUs. As yet another example, when the vehicle 100 is traveling straight, then then the one or more processors 102 are configured to perform the image processing on a narrower portion of the region of interest in images acquired via the front-facing vehicle cameras.

Again, the image processing implemented via the one or more processors 102 may function to detect and/or classify VRUs (as well as other objects), with the image processing being performed on a region of interest that is adjusted responsive to the yaw information. In addition to or as an alternative to the use of the yaw information, the aspects as described herein may implement the REM map data to selectively adjust the region of interest within acquired images that is used for image processing to detect and classify VRUs. For example, and referring back to FIG. 4, the vehicle 402A may identify the upcoming intersection of Main St. and First St. being within a threshold distance of the vehicle 100 using the REM map data referenced to the vehicle 100's current geolocation. In response, the safety system 200 may increase the size of the region of interest in acquired images used for image processing, which may include cameras identified with the right side of the vehicle 100 (i.e. the side facing the bike lane as identified via the REM map data), the front-facing cameras, etc. Thus, the safety system 200 may function to increase the size of the region of interest in acquired images used for image processing when approaching a junction and, as a result, identify a greater number of VRUs and/or identify VRUs earlier, issue warnings earlier, and/or provide a navigational change of the vehicle 100 earlier than would be possible by performing image processing on a narrower region of interest.

An Example Process Flow

Figure 5:
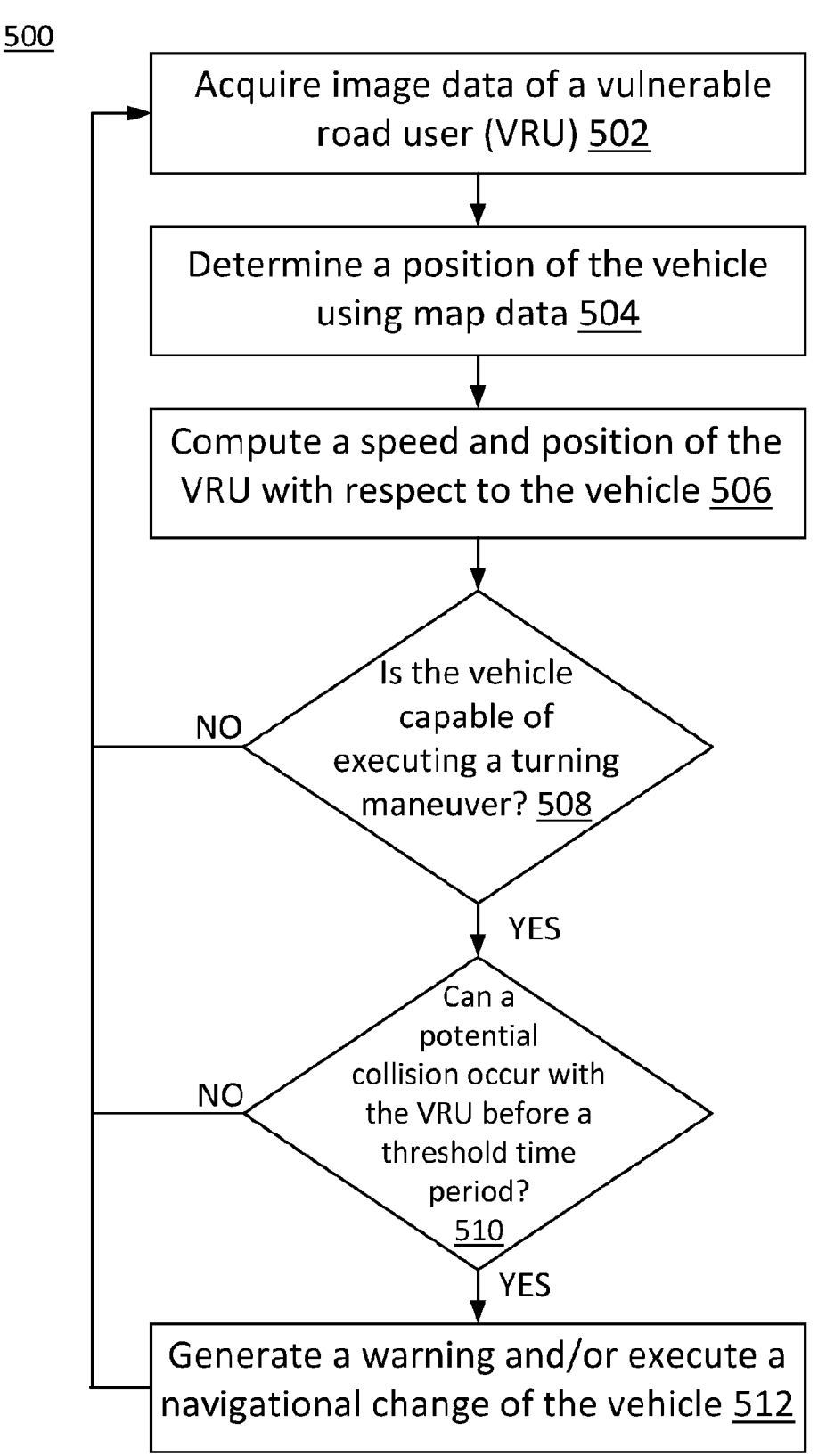
FIG. 5 illustrates an example process flow, in accordance with one or more embodiments of the present disclosure.

FIG. 5 illustrates an example process flow, in accordance with one or more embodiments of the present disclosure. FIG. 5 illustrates an example overall process flow to generate a warning regarding a potential VRU collision and/or to cause a navigational change in the vehicle 100 as discussed above. With reference to FIG. 5, the flow 500 may be a computer-implemented method executed by and/or otherwise associated with one or more processors (processing circuitry) and/or storage devices. These processors and/or storage devices may be associated with one or more computing components identified with the safety system 200 of the vehicle 100 as discussed herein (such as the one or more processors 102, one or more of the processors 214A, 214B, 216, 218, etc.).

The one or more processors identified as discussed herein may execute instructions stored on other computer-readable storage mediums not shown in the Figures (which may be locally-stored instructions and/or as part of the processing circuitries themselves). The flow 500 may include alternate or additional steps that are not shown in FIG. 5 for purposes of brevity, and may be performed in a different order than the steps shown in FIG. 5.

Flow 500 may begin when one or more processors acquire (block 502) image data of a VRU. The image data may be acquired via one or more vehicle cameras and comprise any suitable number of image frames, as noted herein. The image data may thus contain one or more image frames, each having a respective region of interest that may be subjected to image processing to detect and classify the VRU(s), as noted herein.

Flow 500 may include one or more processors determining (block 504) a position of the vehicle using the acquired image data (and/or other sensor data). This may include the safety system 200 performing localization of the vehicle 100 using the geographic coordinates of the vehicle 100 (e.g. obtained via GNSS) and the REM map data obtained via the remote computing device(s) 150. Thus, the position of the vehicle may be determined in this way with respect to a geographic location of the vehicle, which may be referenced to the REM map data to determine the type of road, lane location, position of the vehicle 100 within the lane, type of lane (e.g. a turn lane), a proximity of the vehicle 100 to an intersection, etc.

The process flow 500 includes the one or more processors computing (block 506) the speed and location of the VRU with respect to the vehicle 100. This may include, for example, performing one or more image processing techniques on the regions of interest of the acquired image data and/or utilizing other onboard vehicle sensors, as noted above.

The process flow 500 includes the one or more processors determining (block 508) whether the vehicle 100 is capable of executing a turning maneuver. This may be determined, for instance, from the determined position of the vehicle 100 as noted above, which leverages the use of the REM map data. This may include the identification of a lane position, lane type, proximity to (e.g. within a threshold distance of) a road intersection, determining the turning radius of the vehicle 100, etc. If so, then the process flor 500 continues. Otherwise, the process flow 500 reverts to continuing to acquire image data (block 502).

If the vehicle 100 is capable of executing a turning maneuver, then the process flow 500 includes the one or more processors determining (block 510) whether a potential collision may occur between the vehicle 100 and the detected VRU before expiration of a threshold time period. This may include, as discussed herein, computing a projected route of the vehicle using the current speed of the vehicle 100 and the VRU, assuming that a turn may be executed, and then triggering a warning or navigational change of the vehicle 100 when the projected collision may occur within a future time period that is less than a threshold time period. If so, then the process flow 500 continues. Otherwise, the process flow 500 reverts to continuing to acquire image data (block 502).

Again, the determination regarding whether the vehicle 100 may potentially collide with the VRU may be adjusted based upon the scenario-based rules as discussed herein. Thus, the same metrics that may result in the determination of a future collision between the vehicle 100 and the VRU for one particular scenario may not result in the determination of a future collision for another scenario, as discussed herein.

The process flow 500 includes the one or more processors generating (block 512) a warning with respect to the potential VRU collision and/or executing (block 512) a navigational change of the vehicle to prevent the potential VRU collision, as noted above.

EXAMPLES

The following examples pertain to further aspects.

An example (e.g. example 1) relates to a vehicle. The vehicle comprises one or more cameras configured to acquire image data of a vulnerable road user (VRU); and processing circuitry configured to: determine a position of the vehicle using map data; detect a speed and position of the VRU with respect to the vehicle based upon the acquired image data; and generate a warning when (i) the vehicle is capable of executing a turning maneuver from a current lane that would result in a potential collision between the vehicle and the VRU based upon the position of the vehicle, and (ii) the potential collision between the vehicle and the VRU is calculated to occur within a subsequent time period that is less than a threshold time period.

Another example (e.g. example 2) relates to a previously-described example (e.g. example 1), wherein the processing circuitry is further configured to cause the vehicle to perform a navigational change to prevent a collision between the vehicle and the VRU.

Another example (e.g. example 3) relates to a previously-described example (e.g. one or more of examples 1-2), wherein the processing circuitry is configured to generate the warning further based upon a driving scenario that is defined by the vehicle being located in a predetermined geographic region.

Another example (e.g. example 4) relates to a previously-described example (e.g. one or more of examples 1-3), wherein the processing circuitry is configured to adjust a manner in which the potential collision between the vehicle and the VRU is calculated based upon a driving scenario that is defined by the vehicle being located in a predetermined geographic region.

Another example (e.g. example 5) relates to a previously-described example (e.g. one or more of examples 1-4), wherein the processing circuitry is configured to adjust a manner in which the potential collision between the vehicle and the VRU is calculated by adjusting the threshold time period.

Another example (e.g. example 6) relates to a previously-described example (e.g. one or more of examples 1-5), wherein the processing circuitry is configured to generate the warning further based upon a driving scenario that is defined by a time of day.

Another example (e.g. example 7) relates to a previously-described example (e.g. one or more of examples 1-6), wherein the processing circuitry is configured to detect the speed and position of the VRU with respect to the vehicle by analyzing a region of interest within one or more frames of the acquired image data, and to adjust the region of interest based upon a driving scenario that is defined by the vehicle being located in a predetermined geographic region.

Another example (e.g. example 8) relates to a previously-described example (e.g. one or more of examples 1-7), wherein the predetermined geographic region corresponds to the vehicle being located within a threshold distance of an intersection of two or more roads.

Another example (e.g. example 9) relates to a previously-described example (e.g. one or more of examples 1-8), wherein the processing circuitry is configured to determine whether the vehicle is capable of executing a turning maneuver from a current lane that would result in a potential collision between the vehicle and the VRU based upon a current lane position of the vehicle indicating that a turn in front of the VRU is not possible.

Another example (e.g. example 10) relates to a previously-described example (e.g. one or more of examples 1-9), wherein the map data includes landmarks and corresponding predetermined geographic locations and comprises data provided by a plurality of vehicles that has been aggregated over time.

Another example (e.g. example 11) relates to a previously-described example (e.g. one or more of examples 1-10), wherein the processing circuitry is configured to detect the speed and position of the VRU with respect to the vehicle by analyzing a region of interest within one or more frames of the acquired image data, and to adjust the region of interest based upon yaw information identified with a yaw of the vehicle.

Another example (e.g. example 12) relates to a previously-described example (e.g. one or more of examples 1-11), wherein the region of interest is increased in size in response to the yaw information indicating that that the vehicle yaw has exceeded a threshold.

Another example (e.g. example 13) relates to a previously-described example (e.g. one or more of examples 1-12), wherein the yaw information is obtained via one or more vehicle sensors.

Another example (e.g. example 14) relates to a previously-described example (e.g. one or more of examples 1-13), wherein the yaw information is derived from the images acquired via the one or more cameras.

An example (e.g. example 15) relates to a non-transitory computer-readable medium. The non-transitory computer-readable medium has instructions stored thereon that, when executed by processing circuitry identified with a vehicle, cause the vehicle to: acquire image data of a vulnerable road user (VRU); determine a position of the vehicle using map data; detect a speed and position of the VRU with respect to the vehicle based upon the acquired image data; and generate a warning when (i) the vehicle is capable of executing a turning maneuver from a current lane that would result in a potential collision between the vehicle and the VRU based upon the position of the vehicle, and (ii) the potential collision between the vehicle and the VRU is calculated to occur within a subsequent time period that is less than a threshold time period.

Another example (e.g. example 16) relates to a previously-described example (e.g. example 15), wherein the instructions, when executed by processing circuitry of the vehicle, cause the vehicle to perform a navigational change to prevent a collision between the vehicle and the VRU.

Another example (e.g. example 17) relates to a previously-described example (e.g. one or more of examples 15-16), wherein the instructions, when executed by processing circuitry of the vehicle, cause the vehicle to generate the warning further based upon a driving scenario that is defined by the vehicle being located in a predetermined geographic region.

Another example (e.g. example 18) relates to a previously-described example (e.g. one or more of examples 15-17), wherein the instructions, when executed by processing circuitry of the vehicle, cause the vehicle to adjust a manner in which the potential collision between the vehicle and the VRU is calculated based upon a driving scenario that is defined by the vehicle being located in a predetermined geographic region.

Another example (e.g. example 19) relates to a previously-described example (e.g. one or more of examples 15-18), wherein the instructions, when executed by processing circuitry of the vehicle, cause the vehicle to adjust a manner in which the potential collision between the vehicle and the VRU is calculated by adjusting the threshold time period.

Another example (e.g. example 20) relates to a previously-described example (e.g. one or more of examples 15-19), wherein the instructions, when executed by processing circuitry of the vehicle, cause the vehicle to generate the warning further based upon a driving scenario that is defined by a time of day.

Another example (e.g. example 21) relates to a previously-described example (e.g. one or more of examples 15-20), wherein the instructions, when executed by processing circuitry of the vehicle, cause the vehicle to detect the speed and position of the VRU with respect to the vehicle by analyzing a region of interest within one or more frames of the acquired image data, and to adjust the region of interest based upon a driving scenario that is defined by the vehicle being located in a predetermined geographic region.

Another example (e.g. example 22) relates to a previously-described example (e.g. one or more of examples 15-21), wherein the predetermined geographic region corresponds to the vehicle being located within a threshold distance of an intersection of two or more roads.

Another example (e.g. example 23) relates to a previously-described example (e.g. one or more of examples 15-22), wherein the instructions, when executed by processing circuitry of the vehicle, cause the vehicle to determine whether the vehicle is capable of executing a turning maneuver from a current lane that would result in a potential collision between the vehicle and the VRU based upon a current lane position of the vehicle indicating that a turn in front of the VRU is not possible.

Another example (e.g. example 24) relates to a previously-described example (e.g. one or more of examples 15-23), wherein the map data includes landmarks and corresponding predetermined geographic locations and comprises data provided by a plurality of vehicles that has been aggregated over time.

Another example (e.g. example 25) relates to a previously-described example (e.g. one or more of examples 15-24), wherein the instructions, when executed by processing circuitry of the vehicle, cause the vehicle to detect the speed and position of the VRU with respect to the vehicle by analyzing a region of interest within one or more frames of the acquired image data, and to adjust the region of interest based upon yaw information identified with a yaw of the vehicle.

Another example (e.g. example 26) relates to a previously-described example (e.g. one or more of examples 15-25), wherein the instructions, when executed by processing circuitry of the vehicle, cause the vehicle to increase the region of interest in size in response to the yaw information indicating that that the vehicle yaw has exceeded a threshold.

Another example (e.g. example 27) relates to a previously-described example (e.g. one or more of examples 15-26), wherein the yaw information is obtained via one or more vehicle sensors.

Another example (e.g. example 28) relates to a previously-described example (e.g. one or more of examples 15-27), wherein the yaw information is derived from the acquired image data.

An apparatus as shown and described.

A method as shown and described.

CONCLUSION

It is noted that the aspects described herein enable, via the use of the REM data and scenario-based rules, the determination of whether a VRU collision warning is generated and/or a navigational change in the vehicle 100 is to be executed. Again, such determinations may reduce the frequency of false alarms by leveraging the use of the REM map data. However, because the aspects as described herein rely upon the use of the REM map data and scenario-based rules, which may be received via communications with the remote computing device(s) 150, the safety system 200 may be configured with a default setting in the event that this such data is (e.g. temporarily) unavailable. Thus, the aspects described herein may still meet ECE151 regulatory requirements or other suitable regulatory requirements by using any suitable sensor-based techniques, and then further enhance such techniques when REM map data and the scenario-based rules are once again available. In this way, the vehicle 100 may ensure adequate VRU protections are realized regardless of the data received from the remote computing device(s) 150.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vehicle, comprising:
one or more cameras configured to acquire image data of a vulnerable road user (VRU); and
processing circuitry configured to:
determine a position of the vehicle using map data;
detect a speed and position of the VRU with respect to the vehicle based upon the acquired image data;
generate a warning when (i) a potential collision between the vehicle and the VRU is detected based upon the position of the vehicle, and (ii) the potential collision between the vehicle and the VRU is calculated to occur within a subsequent time period that is less than a threshold time period,
wherein the warning is generated further based upon a driving scenario that is defined by the vehicle being located in a predetermined geographic region; and
adjust the threshold time period based upon a determination of whether the vehicle is capable of executing a turning maneuver from a current lane.

2. The vehicle as claimed in claim 1, wherein the processing circuitry is further configured to cause the vehicle to perform a navigational change to prevent a collision between the vehicle and the VRU.

3. The vehicle as claimed in claim 1, wherein the processing circuitry is configured to adjust a manner in which the potential collision between the vehicle and the VRU is calculated based upon a driving scenario that is defined by the vehicle being located in the predetermined geographic region.

4. The vehicle as claimed in claim 3, wherein the processing circuitry is configured to adjust the manner in which the potential collision between the vehicle and the VRU is calculated by adjusting the threshold time period.

5. The vehicle as claimed in claim 1, wherein the processing circuitry is configured to generate the warning further based upon a driving scenario that is defined by a time of day.

6. The vehicle as claimed in claim 1, wherein the processing circuitry is configured to detect the speed and position of the VRU with respect to the vehicle by analyzing a region of interest within one or more frames of the acquired image data, and to adjust the region of interest based upon a driving scenario that is defined by the vehicle being located in the predetermined geographic region.

7. The vehicle as claimed in claim 1, wherein the predetermined geographic region corresponds to the vehicle being located within a threshold distance of an intersection of two or more roads.

8. The vehicle as claimed in claim 1, wherein the processing circuitry is configured to determine whether the vehicle is capable of executing the turning maneuver from the current lane that would result in the potential collision between the vehicle and the VRU based upon a current lane position of the vehicle indicating that a turn in front of the VRU is not possible.

9. The vehicle as claimed in claim 1, wherein the map data includes landmarks and corresponding predetermined geographic locations and comprises data provided by a plurality of vehicles that has been aggregated over time.

10. A non-transitory computer-readable medium having instructions stored thereon that, when executed by processing circuitry of a vehicle, cause the vehicle to:
acquire image data of a vulnerable road user (VRU);
determine a position of the vehicle using map data;
detect a speed and position of the VRU with respect to the vehicle based upon the acquired image data;
generate a warning when (i) a potential collision between the vehicle and the VRU is detected based upon the position of the vehicle, and (ii) the potential collision between the vehicle and the VRU is calculated to occur within a subsequent time period that is less than a threshold time period,
wherein the warning is generated further based upon a driving scenario that is defined by the vehicle being located in a predetermined geographic region; and
adjust the threshold time period based upon a determination of whether the vehicle is capable of executing a turning maneuver from a current lane.

11. The non-transitory computer-readable medium as claimed in claim 10, wherein the instructions, when executed by the processing circuitry of the vehicle, cause the vehicle to perform a navigational change to prevent a collision between the vehicle and the VRU.

12. The non-transitory computer-readable medium as claimed in claim 10, wherein the instructions, when executed by the processing circuitry of the vehicle, cause the vehicle to adjust a manner in which the potential collision between the vehicle and the VRU is calculated based upon a driving scenario that is defined by the vehicle being located in the predetermined geographic region.

13. The non-transitory computer-readable medium as claimed in claim 12, wherein the instructions, when executed by the processing circuitry of the vehicle, cause the vehicle to adjust the manner in which the potential collision between the vehicle and the VRU is calculated by adjusting the threshold time period.

14. The non-transitory computer-readable medium as claimed in claim 10, wherein the instructions, when executed by the processing circuitry of the vehicle, cause the vehicle to generate the warning further based upon a driving scenario that is defined by a time of day.

15. The non-transitory computer-readable medium as claimed in claim 10, wherein the instructions, when executed by the processing circuitry of the vehicle, cause the vehicle to detect the speed and position of the VRU with respect to the vehicle by analyzing a region of interest within one or more frames of the acquired image data, and to adjust the region of interest based upon a driving scenario that is defined by the vehicle being located in the predetermined geographic region.

16. The non-transitory computer-readable medium as claimed in claim 10, wherein the predetermined geographic region corresponds to the vehicle being located within a threshold distance of an intersection of two or more roads.

17. The non-transitory computer-readable medium as claimed in claim 10, wherein the instructions, when executed by the processing circuitry of the vehicle, cause the vehicle to determine whether the vehicle is capable of executing the turning maneuver from the current lane that would result in the potential collision between the vehicle and the VRU based upon a current lane position of the vehicle indicating that a turn in front of the VRU is not possible.

18. The non-transitory computer-readable medium as claimed in claim 10, wherein the map data includes landmarks and corresponding predetermined geographic locations and comprises data provided by a plurality of vehicles that has been aggregated over time.

* * * * *